US008300498B2

(12) United States Patent
Hegge et al.

(10) Patent No.: US 8,300,498 B2
(45) Date of Patent: Oct. 30, 2012

(54) METHOD FOR DYNAMIC APERTURE DETERMINATION FOR THREE-DIMENSIONAL SURFACE-RELATED MULTIPLE ELIMINATION

(75) Inventors: Robertus F. Hegge, Rijswijk (NL); Roald G. van Borselen, Voorschoten (NL)

(73) Assignee: PGS Geophysical AS, Lysaker (NO)

( * ) Notice: Subject to any disclaimer, the term of this patent is extended or adjusted under 35 U.S.C. 154(b) by 420 days.

(21) Appl. No.: 12/459,329

(22) Filed: Jun. 30, 2009

(65) Prior Publication Data

US 2010/0329079 A1    Dec. 30, 2010

(51) Int. Cl.
*G01V 1/00*    (2006.01)

(52) U.S. Cl. ......................................................... 367/53
(58) Field of Classification Search .................. 367/53
See application file for complete search history.

(56) References Cited

U.S. PATENT DOCUMENTS

| | | | | |
|---|---|---|---|---|
| 4,964,098 A * | 10/1990 | Hornbostel | .................... | 367/73 |
| 5,640,368 A | 6/1997 | Krebs | | |
| 2005/0065758 A1 * | 3/2005 | Moore | ............................ | 703/10 |
| 2006/0155477 A1 | 7/2006 | Matson et al. | | |
| 2007/0032954 A1 | 2/2007 | Moore et al. | | |
| 2008/0043573 A1 | 2/2008 | Bisley et al. | | |
| 2009/0323470 A1 * | 12/2009 | Ferris | ............................. | 367/24 |

FOREIGN PATENT DOCUMENTS

| | | |
|---|---|---|
| GB | 2451949 | 2/2009 |
| SU | 241718 | 9/1969 |
| SU | 344387 | 7/1972 |

OTHER PUBLICATIONS

Eurasian Search Report, date of mailing, Oct. 19, 2010.
A. J. Berkhout, D.J. Verschuur, (1997), Estimation of multiple scattering by iterative inversion, Part I: Theoretical considerations, Geophysics, vol. 62, No. 5, pp. 1586-1595.
D.J. Verschuur, A. J. Berkhout, (1997), Estimation of multiple scattering by iterative inversion, Part II: Practical considerations and examples, Geophysics, vol. 62, No. 5, pages.

(Continued)

*Primary Examiner* — Mark Hellner (57) ABSTRACT

Dips are calculated for a series of sets of adjacent multiple contribution traces, from seismic data representative of subsurface formations, in the vicinity of a boundary of an aperture of a multiple contribution gather, the seismic data acquired by deploying a plurality of seismic sensors proximate an area of the earth's subsurface to be evaluated, the seismic sensors generating at least one of an electrical and optical signal in response to seismic energy. The boundary of the aperture of the multiple contribution gather is recursively extended, based on the calculated dips. Multiple contribution traces in the multiple contribution gather with the extended aperture boundary are stacked to generate predicted multiple traces. The predicted multiple traces are subtracted from the seismic data to generate surface-related multiple attenuated data useful for imaging the subsurface formations.

15 Claims, 6 Drawing Sheets

OTHER PUBLICATIONS

Helmut Jakubowicz, (1998), Wave equation prediction and removal of interbed multiples, EAGE 60$^{th}$ Conference & Technical Exhibition, pp. 1-28.

Ken Matson, Dennis Corrigan, Arthur Weglein, Chi-Yuh Young, (1999), "Inverse scattering internal multiple attenuation: results from complex synthetic and field data examples", SEG Expanded Abstracts, vol. 18, pp. 1060-1063.

Roald Van Borselen, (2002), Fast-track, data-driven interbed multiple removal—a North Sea data example, EAGE 64$^{th}$ Conference & Exhibition, pp. F-40.

E.J. Van Dedem, D.J. Verschuur, (2001), "3D surface multiple prediction using sparse inversion", SEG Expanded Abstracts, pp. 1285-1288.

Roald Van Borselen, Michel Schonewille, Rob Hegge, (2004), "3D SRME: Acquisition & Processing Solutions", SEG Expanded Abstracts, pp. 1241-1244.

Antoly Baumstein, et al., "A practical procedure for application of 3D SRME to conventional marine data", Mar. 2005 Leading Edge, vol. 24, No. 3, pp. 254-258.

Swartjes, Harrie, European Search Report, date of search report: Aug. 9, 2012.

* cited by examiner

METHOD FOR DYNAMIC APERTURE DETERMINATION FOR THREE-DIMENSIONAL SURFACE-RELATED MULTIPLE ELIMINATION

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of surface related multiple elimination in marine seismic surveys.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. The image of the structure of the Earth's subsurface is produced in order to enable an interpreter to select locations with the greatest probability of having petroleum accumulations.

In a marine seismic survey, seismic energy sources are used to generate a seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) and recorded.

The appropriate seismic sources for generating the seismic signal in marine seismic surveys typically include a submerged seismic source towed by a ship and periodically activated to generate an acoustic wavefield. The seismic source generating the wavefield is typically an air gun or a spatially-distributed array of air guns.

The appropriate types of seismic sensors typically include particle velocity sensors (known in the art as geophones) and water pressure sensors (known in the art as hydrophones) mounted within a towed seismic streamer (also know as a seismic cable). Seismic sensors may be deployed by themselves, but are more commonly deployed in sensor arrays within the streamer.

After the reflected wave reaches the seismic sensors, the wave continues to propagate to the water/air interface at the water surface, from which the wave is reflected downwardly, and is again detected by the sensors. The reflected wave continues to propagate and can be reflected upwardly again, by the water bottom or other subterranean formation interfaces. Reflected waves that reflect more than once are termed "multiples" and are typically treated as noise. A particular category of noise comprises multiples that reflect at least once from the water surface and are called surface-related multiples.

Three-dimensional Surface-Related Multiple Elimination (3D SRME) strives to attenuate the surface-related multiples typically by a predict-and-subtract process. The surface-related multiples are first estimated from the seismic data and then the predicted multiples are subtracted from the seismic data to leave a noise-attenuated signal. A first step in this process comprises constructing a multiple contribution gather for a source-receiver trace, which involves the computation of the convolution of pairs of traces over a spatial area called the aperture. A second step comprises constructing a predicted multiple trace which contains primarily multiple reflections, which involves stacking all the multiple contribution traces in the multiple contribution gather for the source-receiver trace. A third step comprises subtracting many such predicted multiple traces from the original seismic data.

The choice of aperture for a multiple contribution gather that is easiest to implement is a rectangular spatial area with preselected inline and crossline dimensions, which is centered on the midpoint location of the source-receiver trace for which the multiple trace will be predicted. An aperture is sufficient for a particular multiple contribution gather when at least the apices of all contributing events in the multiple contribution gather fall within the aperture. This means that the surface reflection points corresponding to the apices lie within the aperture and that Fresnel stacking works to collapse the contributing events into the corresponding multiple events at the time of the apices. Hence, a simple choice of aperture for multiple contribution gathers will inevitably be a trade-off between cost and accuracy. For some multiple contribution gathers, the aperture will be too large and for others it will be too small. An optimally sized and shaped aperture would be both as small as possible to minimize computational efforts and large enough to capture all apices of all surface reflection points and for constructive interference to work in Fresnel stacking for those apices.

Thus, a need exists for a method for efficiently determining appropriate shapes and sizes of apertures for multiple contribution gathers. Preferably, the optimal shape and optimal size of the aperture can be determined dynamically from the seismic data itself.

BRIEF SUMMARY OF THE INVENTION

The invention is a method for transforming seismic data into noise-attenuated data, using dynamic aperture determination for a multiple contribution gather. Multiple traces in seismic data representative of subsurface formations are predicted by the following. Dips are calculated for a series of sets of adjacent multiple contribution traces, from seismic data acquired by deploying a plurality of seismic sensors proximate an area of the earth's subsurface to be evaluated, the seismic sensors generating at least one of an electrical and optical signal in response to seismic energy, in the vicinity of a boundary of an aperture of a multiple contribution gather. The boundary of the aperture of the multiple contribution gather is recursively extended, based on the calculated dips. Multiple contribution traces in the multiple contribution gather with the extended aperture boundary are stacked to generate predicted multiple traces. The predicted multiple traces are subtracted from the seismic data to generate surface-related multiple attenuated data useful for imaging the subsurface formations.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Figure 1:
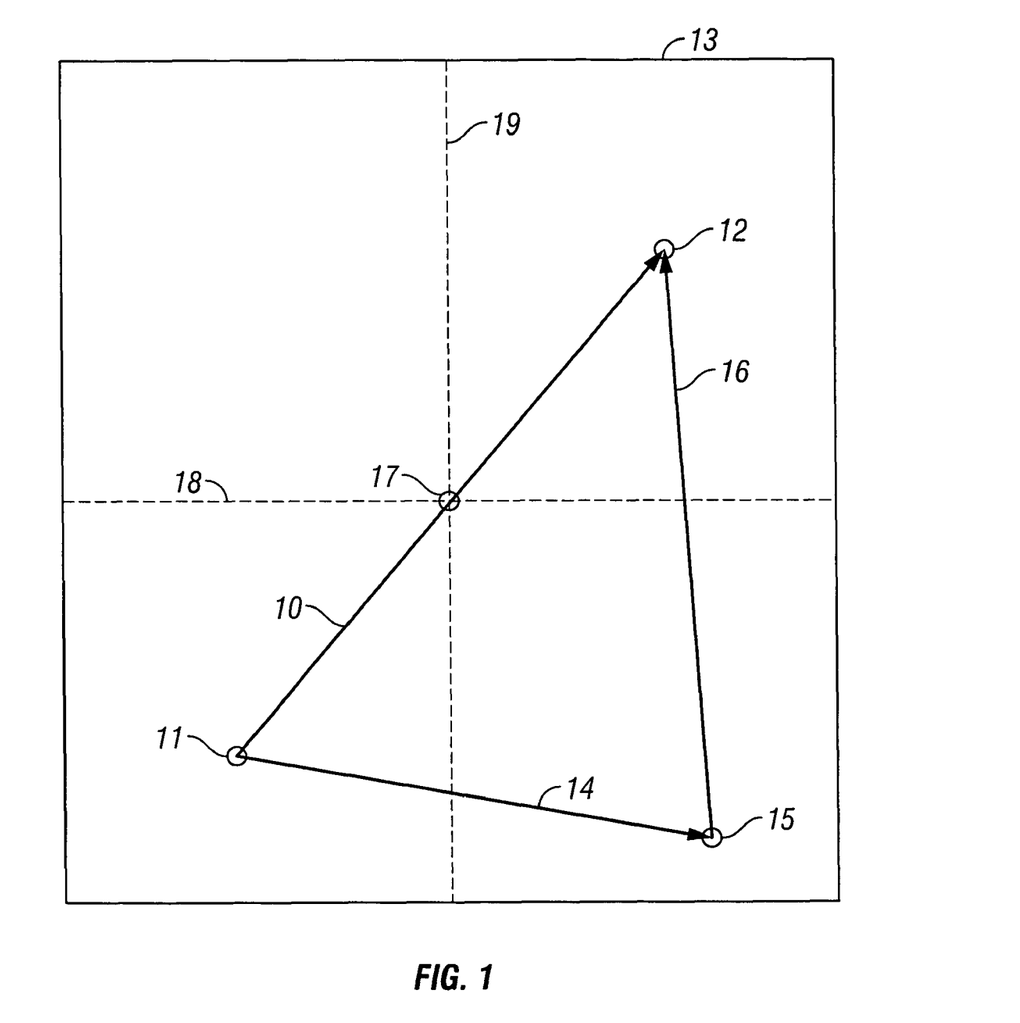
FIG. 1 is a schematic diagram of construction of a multiple contribution gather for a source-receiver trace, as in the method of the invention.

The invention is a method for transforming seismic data into noise-attenuated data, using dynamic aperture determination for a multiple contribution gather. The invention can be used in a 3D predict-and-subtract process to attenuate surface related multiples in seismic data. The location at which the multiples are to be predicted and subtracted is defined by a source-receiver trace. FIG. 1 is a schematic diagram of construction of a multiple contribution gather for a source-receiver trace, as in the method of the invention. The source-receiver trace 10 is determined by a combination of a specific source location 11 and a specific receiver location 12. The process of predicting the surface related multiples from seismic data for this source-receiver trace 10 comprises convolving pairs of traces and then accumulating the convolution results over a surface area 13. The first trace 14 in each pair of convolved traces has the same specific source location 11 as the source-receiver trace 10 and a receiver location at a selected linkage location 15 and the second trace 16 in the pair of convolved traces has its source location at the same linkage location 15 and the same specific receiver location 12 as the source-receiver trace 10. The linkage locations 15 for all pairs of first traces 14 and second traces 16 are distributed over the surface area 13. Each linkage location 15 corresponds to a potential surface reflection point of the surface related multiples associated with this source-receiver trace 10. The traces created by the convolution of the pairs of first traces 14 and second traces 16 are referred to as multiple contribution traces and the ensemble of these multiple contribution traces (before accumulation) is referred to as a multiple contribution gather. The extent or coverage in the surface area 13 of the surface reflection points as incorporated (after accumulation) in the prediction is commonly referred to as the aperture of the prediction.

Figure 2:
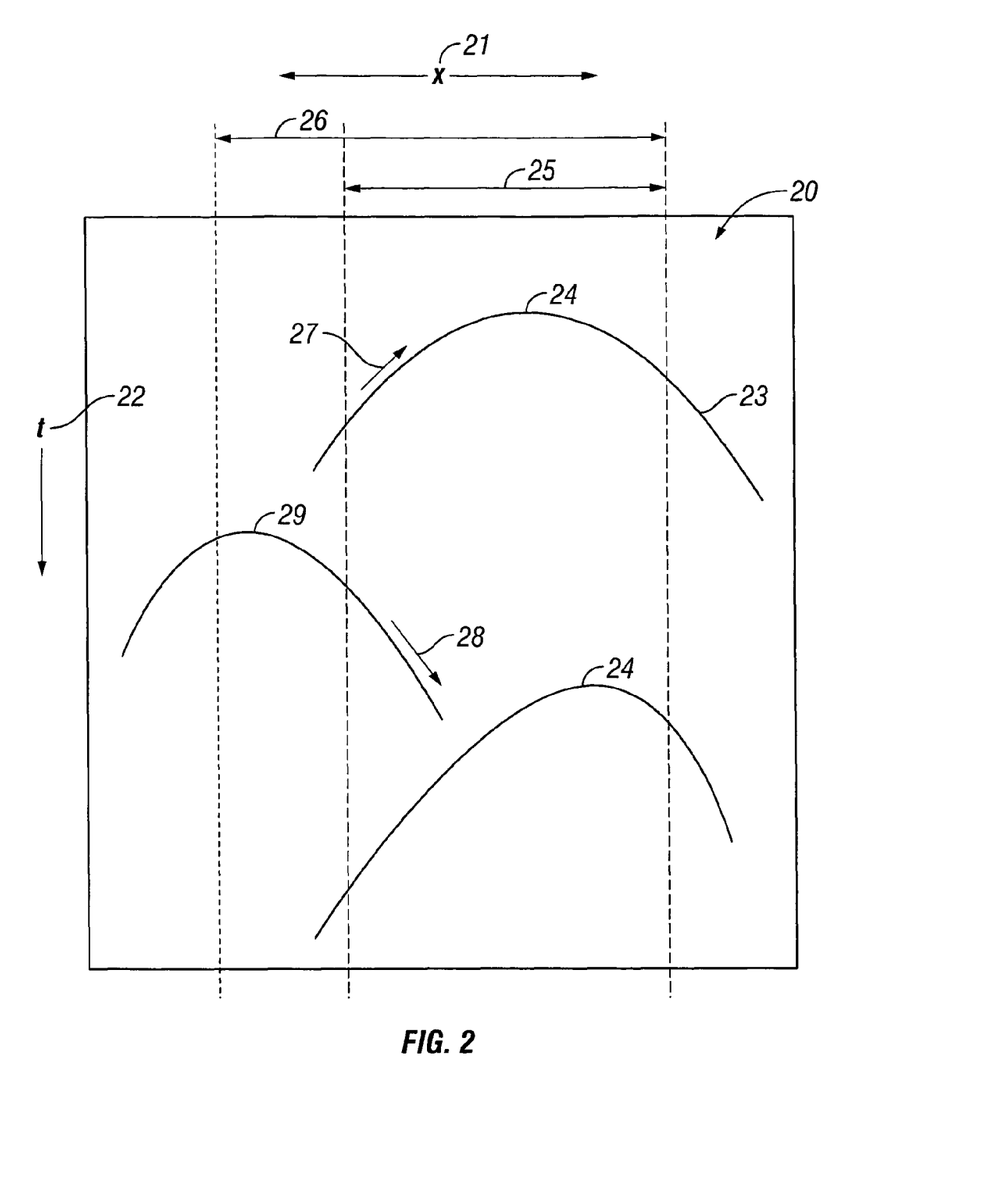
FIG. 2 is a schematic diagram illustrating extending apertures for a multiple contribution gather in the method of the invention.

FIG. 2 is a schematic diagram illustrating extending apertures for a multiple contribution gather in the method of the invention. A multiple contribution gather 20 is shown with an arbitrary spatial dimension 21 at the top and a time dimension 22 proceeding downward on the left. A multiple event in a source-receiver trace, belonging to the source-receiver combination, which occurs at a certain time, will show up in the multiple contribution gather 20 as a surface 23 with an apex 24 within the multiple contribution gather 20 at that same time and the rest of the surface 23 below at later times. Furthermore, the spatial location of the apex 24 will correspond to the spatial location of the surface reflection point of that specific multiple event. The accumulation of the multiple contribution traces into the predicted surface related multiples comprises a process commonly known as Fresnel stacking. Constructive interference at and around each apex 24 enhances the desired predicted multiples and destructive interference further away from each apex 24 reduces the remaining part of the signal (that is, not the predicted multiples). The quality of the multiple prediction depends on how well all relevant surface reflection points are incorporated into the aperture of the multiple contribution gather 20 and how well Fresnel stacking works on the multiple contribution traces. Both depend on selecting the correct aperture and on the spacing between the linkage locations within the aperture.

Returning to FIG. 1, the aperture can be chosen as the simplest case, a rectangular surface area 13 surrounding the midpoint 17 of the source-receiver trace 10 for the specific source location 11 and specific receiver location 12. The rectangular surface area 13 can be parameterized by an inline dimension 18 and a crossline dimension 19 or, alternatively, by an inline aperture and a crossline aperture. Also, the orientation of the rectangular surface area 13 can be varied. However, the surface area 13 of the aperture does not have to be a rectangular area. The aperture's shape can be, for instance, an ellipse or an irregular shape. In any case, the optimal surface area 13 of the aperture should be as small as possible to minimize computational efforts and large enough to capture all apices and be sufficient for constructive interference for those apices to work. The same applies to the spacing or distance between linkage locations 15.

Returning to FIG. 2, an initial aperture 25 for the multiple contribution gather 20 is shown. The method of the invention employs a dip-determination method on (overlapping) portions of the traces in the vicinity of the boundary for the multiple contribution gather 20 to generate an extended aperture 26. If the dips 27 calculated along events across traces are found to be positive, that is, the events themselves are pointing upward, meaning towards an earlier time, and inward, then the corresponding apices 24 will lie inside the multiple contribution gather 20. If the calculated dips 28 are negative, then the corresponding apices 29 will lie outside the multiple contribution gather 20 and the initial aperture 25 should be increased along those parts of the boundary to generate an extended aperture 26. This method of the invention allows the extended aperture 26 to be determined dynamically. Thus, selecting the appropriate aperture area can be made fully or partially data driven. Starting with a small initial aperture 25, the boundary could be extended automatically, based on some measure of the calculated dips.

As one example, an initial measure of dip could be the energy left over after applying a dip filter. More sophisticated measures could also take into account the relative amplitude, time, and slope of the dips. The measures could be made dependent on water bottom depth, its local or global variation or more generally observed or a priori knowledge of geological complexity. For the typical rectangular aperture area generally four related measures would be created, with one on each side. For more complicated shaped areas, like for instance an elliptical or oval area, the number of measures could be made dependent on the curvature of the boundary and be spread along the boundary.

Figure 3:
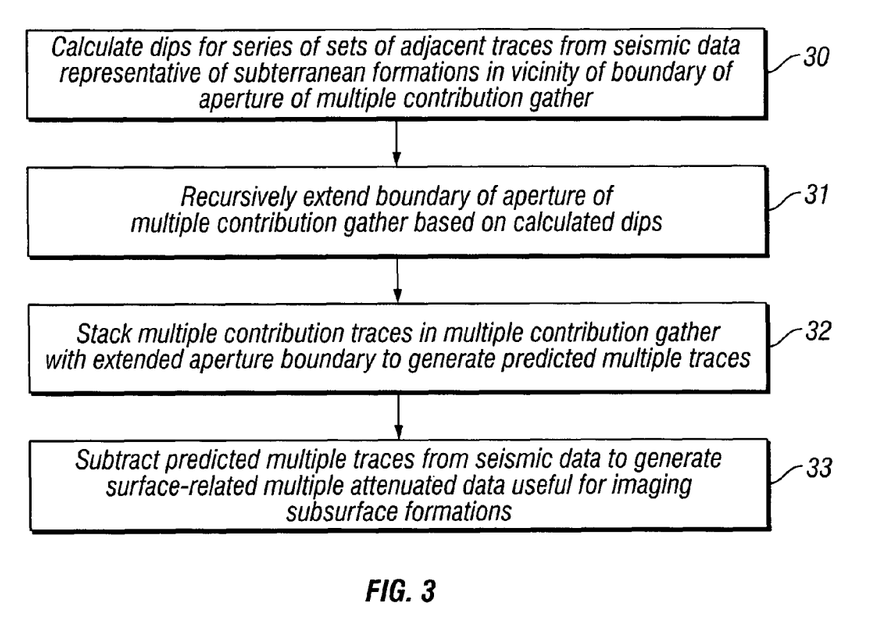
FIG. 3 is a flowchart illustrating an embodiment of the invention for transforming seismic data into noise-attenuated data, using dynamic aperture determination for a multiple contribution gather.
Figure 4:
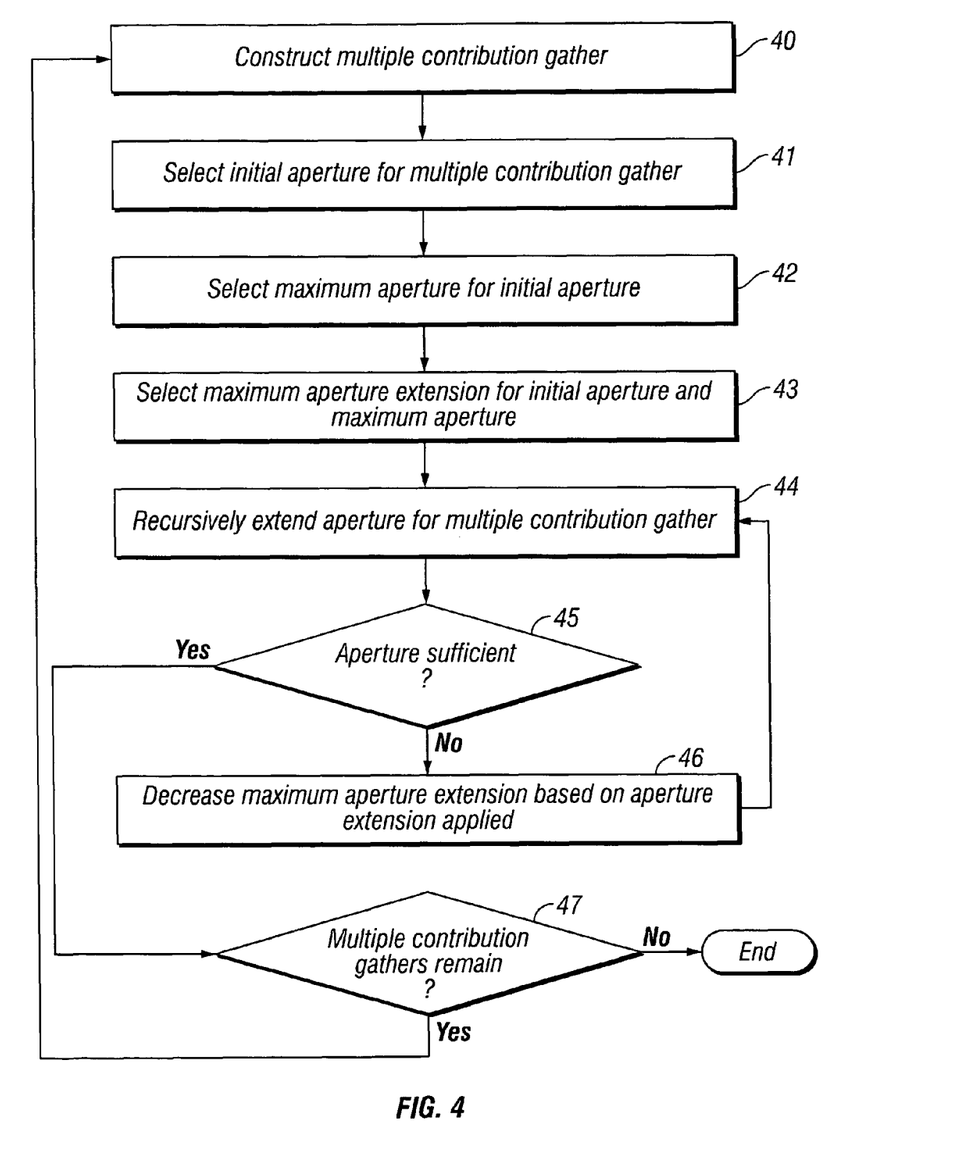
FIG. 4 is a flowchart illustrating another embodiment of the invention for dynamic aperture determination for multiple contribution gathers.
Figure 5:
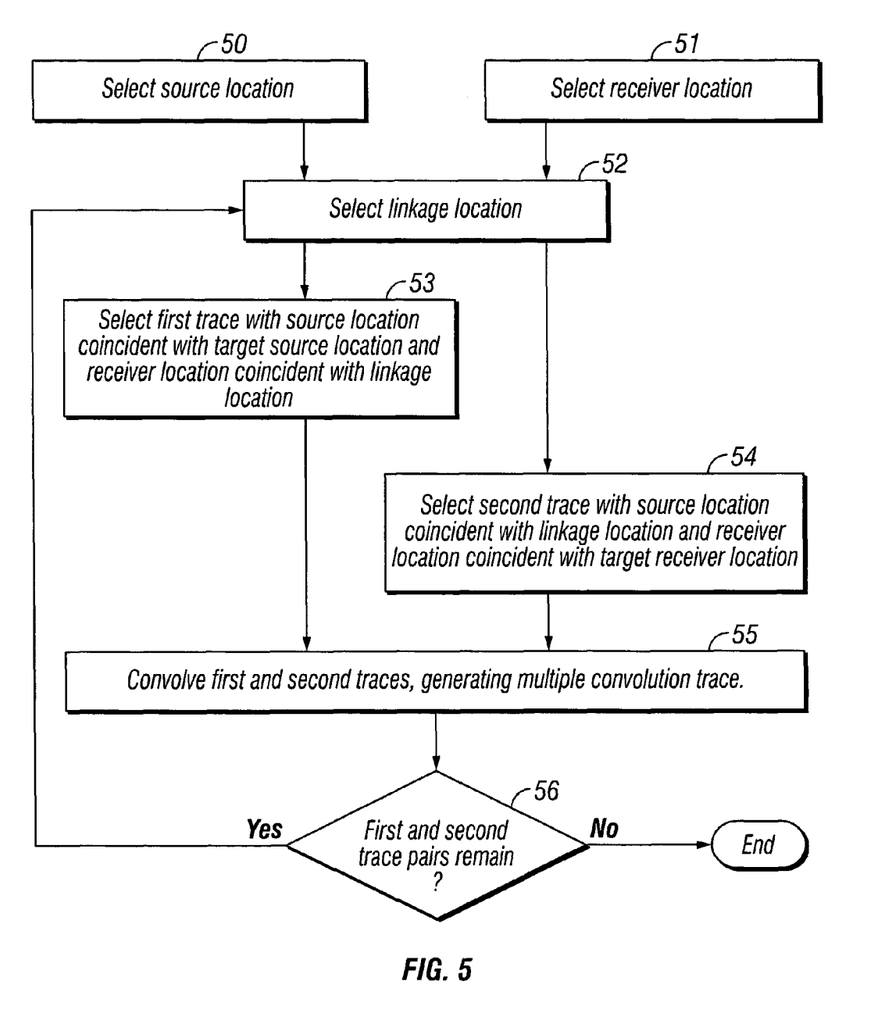
FIG. 5 is a flowchart illustrating an element of the invention, regarding construction of a multiple contribution gather.
Figure 6:
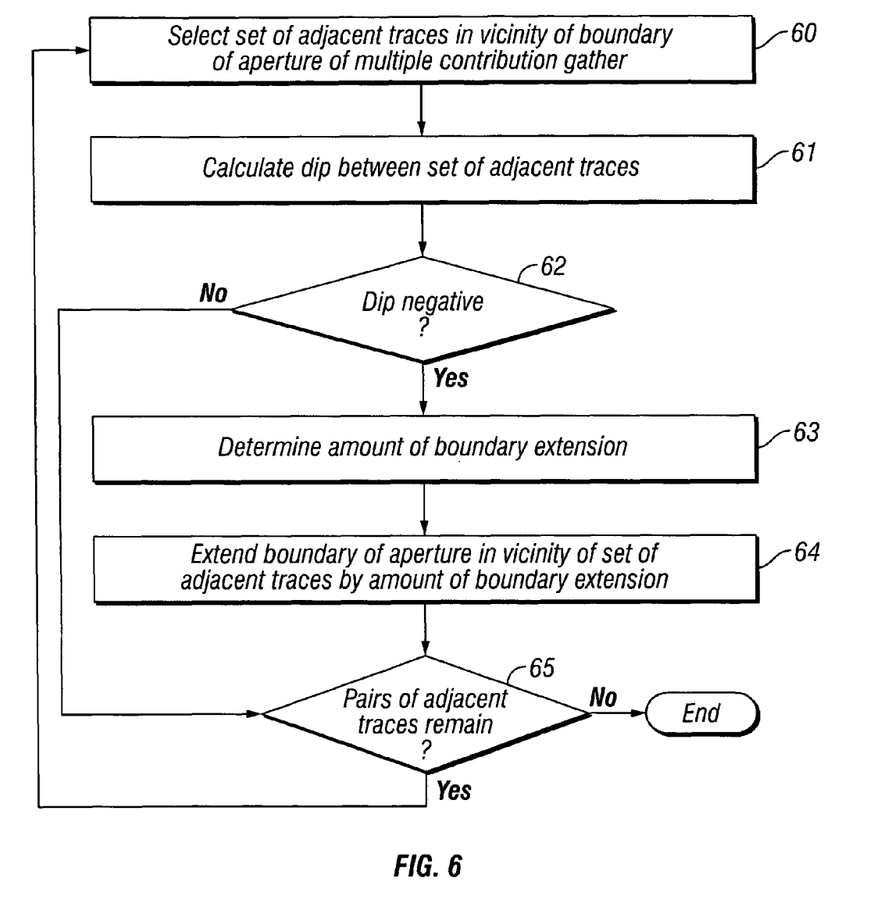
FIG. 6 is a flowchart illustrating an element of the invention, regarding recursive aperture extension.

FIGS. 3-6 show flowcharts illustrating embodiments of the invention for dynamic aperture determination for a multiple contribution gather. FIG. 3 is a flowchart illustrating a general embodiment of the invention. FIG. 4 is a flowchart illustrating a more detailed embodiment of the invention. FIGS. 5-6 are flowcharts further illustrating elements of the invention as described in FIGS. 3-4.

FIG. 3 is a flowchart illustrating an embodiment of the invention for transforming seismic data into noise-attenuated data, using dynamic aperture determination for a multiple contribution gather. At block 30, dips are calculated for a series of sets of adjacent multiple contribution traces, from seismic data representative of subsurface formations, in the vicinity of a boundary of an aperture of a multiple contribution gather. The seismic energy is acquired by deploying a plurality of seismic sensors proximate an area of the earth's subsurface to be evaluated, the seismic sensors generating at least one of an electrical and optical signal in response to seismic energy. At block 31, the boundary of the aperture of a multiple contribution gather is recursively extended based on the dips calculated in block 30. At block 32, multiple contribution traces in the multiple contribution gather with the extended aperture boundary from block 31 are stacked to generate predicted multiple traces. Blocks 30-32 predict multiple traces in the seismic data. At block 33, the predicted multiple traces from block 32 are subtracted from the seismic data to generate surface related multiple attenuated data useful for imaging the subterranean formations.

FIG. 4 is a flowchart illustrating another embodiment of the invention for dynamic aperture determination for multiple contribution gathers. The embodiment illustrated in FIG. 4 comprises a more detailed description than the embodiment illustrated in FIG. 3.

At block 40, a multiple contribution gather is constructed. The construction of a multiple contribution gather is described in more detail below in the discussion with regard to the flowchart in FIG. 5.

At block 41, an initial aperture is selected for the multiple contribution gather determined in block 40. The initial aperture may be selected in any shape and size that is appropriate for the multiple contribution gather from block 40. The shapes commonly include, but are not limited to, rectangles, ellipses, and irregular shapes. In one embodiment, the choice of an initial aperture can take the final aperture from previously determined multiple contribution gathers into account.

In another embodiment, the choice of an initial aperture for a trace can be made to vary as a function of trace related attributes that include, but not limited to, offset, meaning the distance between the source and receiver coordinates of a trace; azimuth, meaning the angle between a line through the source and receiver coordinates and a predefined reference direction; and inline and crossline offsets, meaning the offset distances along the reference direction and perpendicular to the reference direction, respectively.

At block 42, a maximum aperture is selected for the initial aperture selected in block 41. A maximum aperture can be defined based on the maximum velocity, the length of the source-receiver trace that the multiple prediction is done for, and the offset (distance between source and receiver) of that source-receiver trace.

At block 43, a maximum aperture extension is selected depending upon the initial aperture selected in block 41 and the maximum aperture selected in block 42. The maximum aperture extension can vary along the boundary, in particular when the initial boundary of the aperture of multiple contribution gather has an irregular shape or changes to an irregular shape due to a previously applied extension along only part of the boundary.

A measure can be built on the basis of factors including, but not limited to, the temporal location in the measured trace, amplitude and angle of the dips, and the amplitude, energy or other derived values from the multiple contribution gather in the vicinity of (and including) the boundary. This measure can be used to constrain the recursion to viable updates of the aperture. In another embodiment, this measure can also be taken into account in the choice of initial aperture for future multiple contribution gathers At block 44, the aperture is recursively extended. This recursive aperture extension is described below in more detail in the discussion with regard to the flowchart in FIG. 6.

At block 45, it is determined if the current aperture is sufficient. If the current aperture is not sufficient, then the process continues to block 46. If the current aperture is sufficient, then the process continues to block 47.

Sufficient aperture means that all multiple reflections present in the source-receiver trace for the multiple contribution gather should be properly estimated by the estimated multiple trace. Hence, the surface reflection points covered by the aperture used in the construction of the multiple contribution gather in block 40 should correspond to all these multiple reflections. Each surface reflection point has a corresponding apex in the multiple contribution gather. An apex is the spatial location corresponding to the minimum time of a spatially varying surface whereby the times of the surface increase when moving away from the apex. In an alternative embodiment, the dimension time could be replaced by the dimension depth.

Additionally, the aperture is sufficient when Fresnel stacking works properly for those apices. Fresnel stacking is the stacking of data to obtain higher signal to noise ratios of a particular reflection event, whereby the amount of data to be stacked is related to the portion of the corresponding reflector from which reflected energy can reach a detector within one-half wavelength of the first reflected energy.

At block 46, the maximum aperture extension selected in block 43 is decreased depending upon the amount of aperture extension applied in block 44.

At block 47, it is determined if more multiple contribution gathers remain to have an aperture determined. If more multiple contribution gathers remain, then the process returns to block 40 to select another multiple contribution gather. If no more multiple contribution gathers need to be examined, then the process ends.

FIG. 5 is a flowchart illustrating an element of the invention, regarding construction of a multiple contribution gather. FIG. 5 illustrates in more detail the portion of the invention discussed in block 40 of FIG. 4, above.

At block 50, a source location is selected.

At block 51, a receiver location is selected. The source location from block 50 and the receiver location from block 51 define the source-receiver trace.

At block 52, a linkage location is selected. The linkage location corresponds to a potential surface reflection point of the multiples associated with the source-receiver trace. The linkage locations depend on the aperture, as constructed with reference to the discussion of the flowchart in FIG. 4, and appropriate spacing between the linkage locations.

At block 53, a first trace is selected from available traces that have a source location that is substantially coincident with the source location selected in block 50 and a receiver location substantially coincident with the linkage location selected in block 52. Thus, the first trace is a member of a common source gather for the source location selected in block 50.

At block 54, a second trace is selected from the available traces that have a source location that is substantially coincident with the linkage location selected in block 52 and a receiver location that is substantially coincident with the receiver location selected in block 51. Thus, the second trace is a member of a common receiver gather for the receiver location selected in block 51.

The receiver coordinates of the first trace in the common source gather are substantially coincident with the source coordinates of the second trace in the common receiver gather. Since source and receiver locations in recorded data are seldom precisely coincident, it may be necessary, in another embodiment, to regularize the data sets to a nominal geometry so that this coincidence of source and receiver location is achieved. In another embodiment, the multiples are then predicted for the original geometry while using the regularized data sets.

At block 55, the first trace from block 53 and the second trace from block 54 are convolved with each other. This convolution can be done in a time domain or, alternatively, the convolution can be performed as a multiplication in a frequency domain. The trace resulting from the convolution is a multiple contribution trace. The set of all multiple contribution traces generated here forms the multiple contribution gather.

At block 56, it is determined if any other pairs of first and second traces remain to be convolved. If more pairs of first and second traces remain, then the process returns to block 52 to select another pair. If no other pairs of first and second traces remain, then the process ends.

FIG. 6 is a flowchart illustrating an element of the invention, regarding recursive aperture extension. FIG. 6 illustrates in more detail the portion of the invention discussed in block 44 of FIG. 4, above.

At block 60, a set of adjacent multiple contribution traces from a multiple contribution gather are selected in the vicinity of a boundary of an aperture of the multiple contribution gather. How many traces are selected in the sets of adjacent multiple contribution traces is determined by how many traces are needed to calculate reliable estimates for dip, as will be done in block 61 below.

In one example embodiment, the set of adjacent multiple contribution traces comprises two adjacent multiple contribution traces. In another example embodiment, the set of adjacent multiple contribution traces comprises a sequence of more than two adjacent multiple contribution traces. In yet another example embodiment, the set of adjacent multiple contribution traces comprises a block of adjacent multiple contribution traces. For instance, the block could comprise the 25 adjacent multiple contribution traces in a 5 inline by 5 crossline block of traces. The method of the invention is not meant to be restricted by these examples of sets of adjacent multiple contribution traces, but is applicable to any such set of adjacent multiple contribution traces.

At block 61, a dip is calculated for the set of adjacent multiple contribution traces selected in block 60. The dips in the gather can be used to learn where the apices are in the gather. Dip is the slope between two adjacent multiple contribution traces in the gather of the same seismic event. The dip is measured as a ratio between a time difference and a space difference (analogous to dt/dx). Although a dipping event is generally meant to be non-horizontal, a horizontal event is not excluded.

An aperture of the multiple contribution gather that is too small can be detected and enlarged automatically by examining the dips at the boundary of the gather. The detection and enlargement can be done recursively, whereby the last aperture used initializes the process of detection and enlargement for determining a new aperture. If there are negative dips in the vicinity of a certain part of the boundary of the multiple contribution gather, then that part of the boundary should be extended, as there are apices outside the gather.

At block 62, it is determined if the dip calculated in block 61 is negative. Negative dip means that the slope of an event which from the outside to the inside of a multiple contribution gather also increases in time or depth. This implies that the apex of that event lies outside the gather, as the apex will always be located at an earlier time. If the dip is negative, then the process continues to block 63 to extend the boundary of the aperture. If the dip is not negative, then the process continues to block 65.

At block 63, an amount of boundary extension is determined. The amount of extension of the boundary of the aperture can be made to vary as a function of factors including, but not limited to, temporal location, water depth associated with the source-receiver trace, and largest dip detected in the vicinity of the boundary.

At block 64, the aperture is extended in the vicinity of the set of adjacent multiple contribution traces selected in block 60 by the amount of boundary extension determined in block 63.

At block 65, it is determined if any more sets of adjacent multiple contribution traces remain. If more sets of adjacent multiple contribution traces remain, then the process returns to block 60 to select another set of adjacent multiple contribution traces in the vicinity of the boundary of the aperture. If no more sets of adjacent multiple contribution traces remain, then the process ends.

In an alternative embodiment, the multiple contribution traces that would be added to the multiple contribution gather after extension of the boundary are stacked to generate a correction trace. This correction trace can then be applied to the predicted multiple trace determined by accumulating (through Fresnel stacking) the multiple contribution traces in the multiple contribution gather before extension of the boundary.

In another embodiment, the demultiple method SRME could be replaced by Interbed Multiple Elimination (IME), which refers to an extension to predict interbed or internal multiples, whereby a triplet of traces and two convolutions are used as part of the method.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for transforming seismic data into noise-attenuated data, comprising:
   predicting multiple traces in seismic data representative of subsurface formations by the following:
      calculating dips for a series of sets of adjacent multiple contribution traces, from seismic data acquired by deploying a plurality of seismic sensors proximate an area of the earth's subsurface to be evaluated, the seismic sensors generating at least one of an electrical and optical signal in response to seismic energy, in the vicinity of a boundary of an aperture of a multiple contribution gather;
      recursively extending the boundary of the aperture of the multiple contribution gather, based on the calculated dips; and
      stacking multiple contribution traces in the multiple contribution gather with the extended aperture boundary to generate predicted multiple traces; and
   subtracting the predicted multiple traces from the seismic data to generate surface-related multiple attenuated data useful for imaging the subsurface formations.

2. The method of claim 1, further comprising:
   constructing a multiple contribution gather;
   selecting an initial aperture for the multiple contribution gather;
   selecting a maximum aperture for the initial aperture;
   selecting a maximum aperture extension for the initial aperture and the maximum aperture;
   recursively extending the aperture; and
   decreasing the maximum aperture extension based on the extension of the aperture.

3. The method of claim 2, wherein the constructing a multiple contribution gather comprises:
   selecting a source location;
   selecting a receiver location;
   selecting a set of linkage locations;
   repeating the following for each linkage location in the set of linkage locations:
      selecting a first trace with a source location substantially coincident with the selected source location and a receiver location substantially coincident with the linkage location;
      selecting a second trace with a source location substantially coincident with the linkage location and a receiver location substantially coincident with the selected receiver location; and
      convolving the first trace with the second trace, generating a multiple contribution trace; and
   generating the multiple contribution gather from the multiple contribution traces.

4. The method of claim 2, wherein the recursively extending the aperture comprises:
   selecting a series of sets of adjacent multiple contribution traces from the multiple contribution gather in the vicinity of a boundary of the aperture of the multiple contribution gather; and
   repeating the following for each set of adjacent multiple contribution traces in the series of sets of adjacent multiple contribution traces:
      calculating a dip for the set of adjacent multiple contribution traces; and
      repeating the following for negative dips:
         determining an amount of aperture boundary extension; and
         extending the boundary in the vicinity of the set of adjacent multiple contribution traces by the amount of boundary extension.

5. The method of claim 4, further comprising:
   stacking multiple contribution traces added to the multiple contribution gather after extension of the boundary, generating a correction trace; and
   applying the correction trace to correct the predicted multiple trace determined for the multiple contribution gather before extension of the boundary.

6. A method for geophysical prospecting, comprising:
   disposing a marine seismic streamer in a body of water;
   responsive to signals recorded at receivers in the marine seismic streamer, calculating seismic traces representing physical wavefields traveling in the body of water incident on the receivers;
   correcting for surface-related multiples by transforming the seismic traces into predicted multiple traces, the transforming comprising:
      calculating dips for a series of sets of adjacent multiple contribution traces in the vicinity of a boundary of an aperture of a multiple contribution gather; and
      recursively extending the boundary of the aperture of the multiple contribution gather, based on the calculated dips;
      stacking multiple contribution traces in the multiple contribution gather with the extended aperture boundary to generate predicted multiple traces; and
   recording the predicted multiple traces,
   subtracting the predicted multiple traces from the seismic traces to generate surface-related multiple attenuated traces.

7. The method of claim 6, further comprising:
constructing a multiple contribution gather;
selecting an initial aperture for the multiple contribution gather;
selecting a maximum aperture for the initial aperture;
selecting a maximum aperture extension for the initial aperture and the maximum aperture;
recursively extending the aperture; and
decreasing the maximum aperture extension based on the extension of the aperture.

8. The method of claim 7, wherein the constructing a multiple contribution gather comprises:
selecting a source location;
selecting a receiver location;
selecting a set of linkage locations;
repeating the following for each linkage location in the set of linkage locations:
selecting a first trace with a source location substantially coincident with the selected source location and a receiver location substantially coincident with the linkage location;
selecting a second trace with a source location substantially coincident with the linkage location and a receiver location substantially coincident with the selected receiver location; and
convolving the first trace with the second trace, generating a multiple contribution trace; and
generating the multiple contribution gather from the multiple contribution traces.

9. The method of claim 7, wherein the recursively extending the aperture comprises:
selecting a series of sets of adjacent multiple contribution traces from the multiple contribution gather in the vicinity of a boundary of the aperture of the multiple contribution gather; and
repeating the following for each set of adjacent multiple contribution traces in the series of sets of adjacent multiple contribution traces:
calculating a dip for the set of adjacent multiple contribution traces; and
repeating the following for negative dips:
determining an amount of aperture boundary extension; and
extending the boundary in the vicinity of the set of adjacent multiple contribution traces by the amount of boundary extension.

10. The method of claim 9, further comprising:
stacking multiple contribution traces added to the multiple contribution gather after extension of the boundary, generating a correction trace; and
applying the correction trace to correct the predicted multiple trace determined for the multiple contribution gather before extension of the boundary.

11. A computer readable medium with a computer program stored thereon, the program having logic operable to cause a programmable computer to perform steps comprising:
calculating dips for a series of sets of adjacent multiple contribution traces in the vicinity of a boundary of an aperture of a multiple contribution gather; and
recursively extending the boundary of the aperture of the multiple contribution gather, based on the calculated dips.

12. The medium of claim 11, further comprising:
constructing a multiple contribution gather;
selecting an initial aperture for the multiple contribution gather;
selecting a maximum aperture for the initial aperture;
selecting a maximum aperture extension for the initial aperture and the maximum aperture;
recursively extending the aperture; and
decreasing the maximum aperture extension based on the extension of the aperture.

13. The medium of claim 12, wherein the constructing a multiple contribution gather comprises:
selecting a source location;
selecting a receiver location;
selecting a set of linkage locations;
repeating the following for each linkage location in the set of linkage locations:
selecting a first trace with a source location substantially coincident with the selected source location and a receiver location substantially coincident with the linkage location;
selecting a second trace with a source location substantially coincident with the linkage location and a receiver location substantially coincident with the selected receiver location; and
convolving the first trace with the second trace, generating a multiple contribution trace; and
generating the multiple contribution gather from the multiple contribution traces.

14. The medium of claim 12, wherein the recursively extending the aperture comprises:
selecting a series of sets of adjacent multiple contribution traces from the multiple contribution gather in the vicinity of a boundary of the aperture of the multiple contribution gather; and
repeating the following for each set of adjacent multiple contribution traces in the series of sets of adjacent multiple contribution traces:
calculating a dip for the set of adjacent multiple contribution traces; and
repeating the following for negative dips:
determining an amount of aperture boundary extension; and
extending the boundary in the vicinity of the set of adjacent multiple contribution traces by the amount of boundary extension.

15. The medium of claim 14, further comprising:
stacking multiple contribution traces added to the multiple contribution gather after extension of the boundary, generating a correction trace; and
applying the correction trace to correct the predicted multiple trace determined for the multiple contribution gather before extension of the boundary.

* * * * *